Oct. 8, 1929.　　　　A. P. BRUSH　　　　1,731,042
MIXTURE COMMINGLING MEANS FOR INTERNAL COMBUSTION ENGINES
Filed March 12, 1923
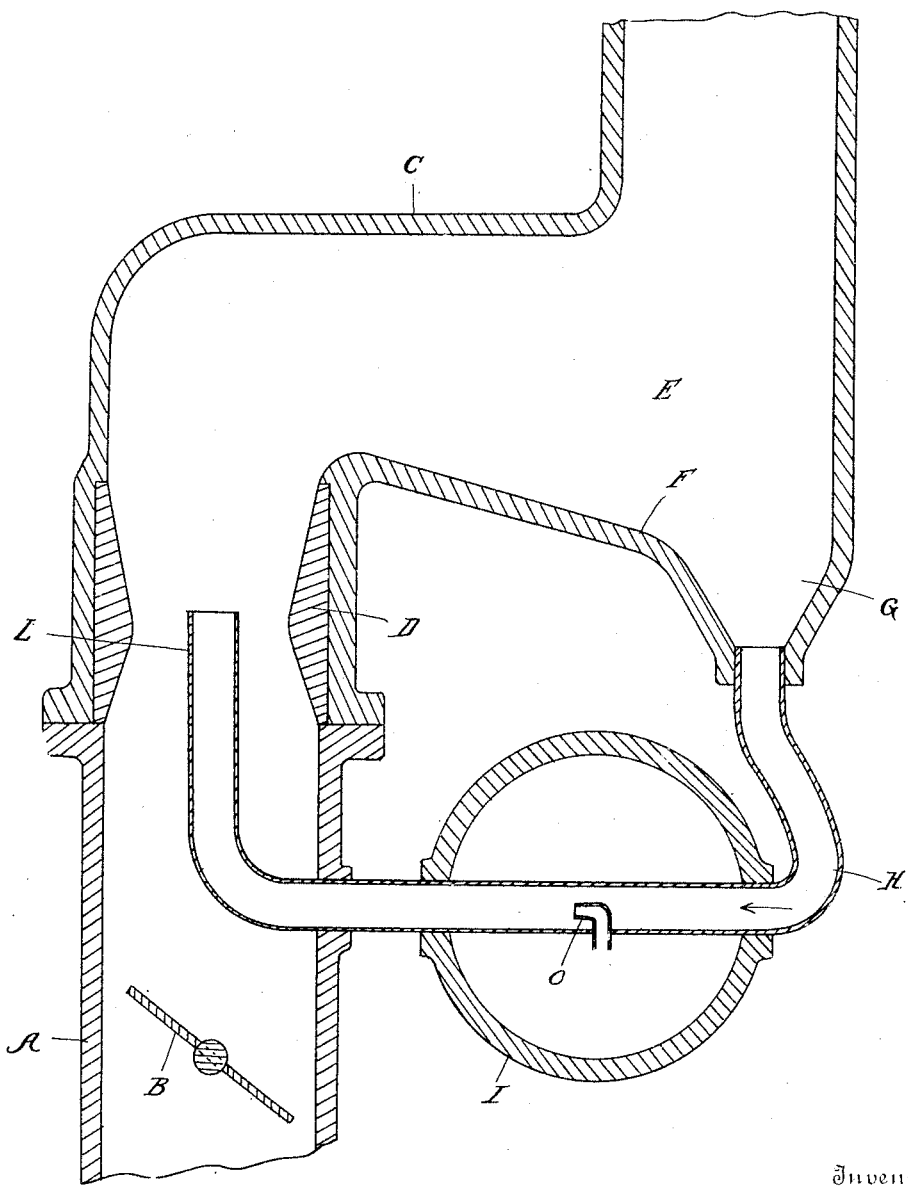
Inventor
Alanson P. Brush
By Whittemore Hulbert Whittemore
　 & Belknap　Attorneys Patented Oct. 8, 1929

1,731,042

UNITED STATES PATENT OFFICE

ALANSON P. BRUSH, OF DETROIT, MICHIGAN

MIXTURE-COMMINGLING MEANS FOR INTERNAL-COMBUSTION ENGINES

Application filed March 12, 1923. Serial No. 624,630.

The invention relates to explosive mixture forming means for internal combustion engines and consists in the simple and novel construction by which the proportioned mixture is more thoroughly commingled.

Fig. 1 is a vertical longitudinal section of my improved construction. Fig. 2 is a semi-diagrammatical view showing my improvement applied to the intake manifold of an internal combustion engine.

A is the portion of the intake of an internal combustion engine in which is located the throttle B controlling the admission of a proportioned mixture of fuel and air from the carbureter (not shown). C is a casing connecting with the conduit A in which is arranged the venturi D with an expansion chamber E on the engine side thereof. This expansion chamber preferably extends laterally from the discharge end of the venturi and is provided with an inclined bottom wall F for draining any separated portion of the liquid fuel content into a well G. H is a conduit leading from the well G and passing through a portion of an exhaust conduit I and then into the conduit A terminating in a nozzle L extending in the direction of the current.

With the construction as described, the proportioned mixture of liquid fuel and air discharged from the carburetor in passing through the venturi D will cause a pressure drop at the discharge end of the nozzle L, so as to induce the flow of a limited volume of air from the expansion chamber E through the conduit H. When the mixture is discharged from the venturi into the expansion chamber, the larger particles of unvaporized liquid fuel carried in suspension will separate by gravity and will drain into the well G and conduit H. Here the flow of air through the conduit will carry the liquid first through the exhaust manifold and then to the discharge nozzle L, which, leading to the throat of the venturi, will reatomize and reintroduce any remaining liquid. During transit through the heated portion of the conduit the liquid will be raised in temperature to facilitate vaporization, and, as the vapor is carried away as fast as formed, there will be little accumulation of vapor pressure so that the vaporization of the liquid is not reduced. This results in vaporizing the more refractory portions or end points of the fuel and without subjecting the same to sufficient heat to carbonize. Thus the fuel, when reintroduced into the main current, will form a more stable mixture, but any particles again dropping out of suspension will retrace the circuit until either completely vaporized or finely atomized.

The construction described is one that can be applied to any internal combustion engine at small expense and will effectively produce a relatively stable explosive mixture.

To stimulate the commingling of the fuel, I may provide means for introducing a small amount of exhaust gases into the conduit H. Thus as shown, a nozzle O in the conduit H is in communication with the exhaust conduit I to permit a small portion of such gases to enter said conduit.

What I claim as my invention is:

1. The combination with the intake conduit of an internal combustion engine, of a restriction and an expansion in said conduit arranged successively in the direction of flow, a return conduit from said expansion portion to said restricted portion, heating means for said return conduit, and means for introducing into said return conduit a small portion of the exhaust gases.

2. The combination with an intake of an internal combustion engine and an exhaust manifold, of an expansion chamber for effecting a gravity separation of a portion of the liquid fuel content, means for returning and reintroducing the separated fuel into a portion of said intake previously traversed by the mixture, said means comprising a conduit passing through said exhaust manifold, and means for introducing into said return conduit a small portion of the exhaust gases.

In testimony whereof I affix my signature.

ALANSON P. BRUSH.